(12) United States Patent
Ansari et al.

(10) Patent No.: US 6,288,742 B1
(45) Date of Patent: Sep. 11, 2001

(54) VIDEO CAMERA INCLUDING MULTIPLE IMAGE SENSORS

(75) Inventors: Ahmad C. Ansari, Eatontown; Behzad Shahraray, Freehold; Matthew S. Whalen, Rumson, all of NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 08/863,120

(22) Filed: May 27, 1997

Related U.S. Application Data

(63) Continuation of application No. 08/531,982, filed on Sep. 21, 1995, now abandoned.

(51) Int. Cl.[7] .................................................. H04N 5/232
(52) U.S. Cl. .................... 348/212; 348/14.08; 348/218; 348/222; 348/241
(58) Field of Search .................... 358/906, 909.1; 348/13, 15, 16, 143, 169, 207, 211–213, 222, 241, 243, 280, 279, 552, 607, 608, 14.01, 14.02, 14.05, 14.08, 14.09

(56) References Cited

U.S. PATENT DOCUMENTS

| | | | |
|---|---|---|---|
| 264,343 | 5/1882 | Che | D16/7 |
| 3,636,270 | * 1/1972 | McIntosh et al. | 179/84 VF |
| 3,748,992 | 7/1973 | Anger | 95/36 |
| 4,091,422 | * 5/1978 | Amster | 358/210 |
| 4,097,882 | 6/1978 | Engelsmann | 354/197 |
| 4,104,663 | 8/1978 | Yamazaki et al. | 354/197 |
| 4,670,786 | * 6/1987 | Ricciardi | 348/518 |
| 4,943,850 | * 7/1990 | Asaida | 358/55 |
| 4,967,220 | 10/1990 | Ho | 354/204 |
| 5,003,378 | * 3/1991 | Murao | 358/29 |
| 5,051,821 | * 9/1991 | Vittot et al. | 358/81 |
| 5,068,738 | * 11/1991 | Miida | 358/227 |
| 5,130,814 | 7/1992 | Spencer | 358/335 |
| 5,157,499 | 10/1992 | Oguma et al. | 358/213.11 |
| 5,159,455 | 10/1992 | Cox | 358/213.11 |
| 5,164,753 | 11/1992 | Fritzer | 354/120 |
| 5,264,944 | 11/1993 | Takemura | 358/335 |
| 5,280,186 | 1/1994 | Lee | 257/232 |
| 5,294,951 | 3/1994 | Lo | 354/111 |
| 5,321,528 | 6/1994 | Nakamura | 358/482 |
| 5,343,243 | 8/1994 | Maeda | 348/222 |
| 5,359,363 | * 10/1994 | Kuban | 348/143 |
| 5,367,331 | 11/1994 | Secher et al. | 348/14 |
| 5,371,540 | 12/1994 | Tamura et al. | 348/222 |
| 5,428,386 | * 6/1995 | D'Alfonso | 348/264 |
| 5,436,660 | * 7/1995 | Sakamoto | 348/207 |
| 5,448,294 | * 9/1995 | Yamazaki | 348/230 |
| 5,486,853 | * 1/1996 | Baxter et al. | 348/222 |
| 5,488,413 | * 1/1996 | Elder et al. | 348/13 |
| 5,696,553 | * 12/1997 | D'Alfonso | 348/211 |

OTHER PUBLICATIONS

Flanagan et al., Commuter–steered microphone arrays for sound transduction in large rooms, J. Acoust. Soc. Am., vol. 78, No. 5, pp. 1508–1518, Nov. 1985.

Hitachi Application Note: Digital Movie Camera Demonstration System MV–DS6A.

* cited by examiner

Primary Examiner—Wendy R. Garber
Assistant Examiner—Ngoc-Yen Vu

(57) ABSTRACT

A digital camera comprising a first lens for focusing a first image, a second lens for focusing a second image, a first sensor for converting a light intensity and color pattern of the first image into a first electrical signal, a second sensor for converting a light intensity and color pattern of the second image into a second electrical signal, a processing unit for processing the first electrical signal and the second electrical signal and a switch for selectively coupling either the first electrical signal or the second electrical signal to the processing unit.

7 Claims, 7 Drawing Sheets

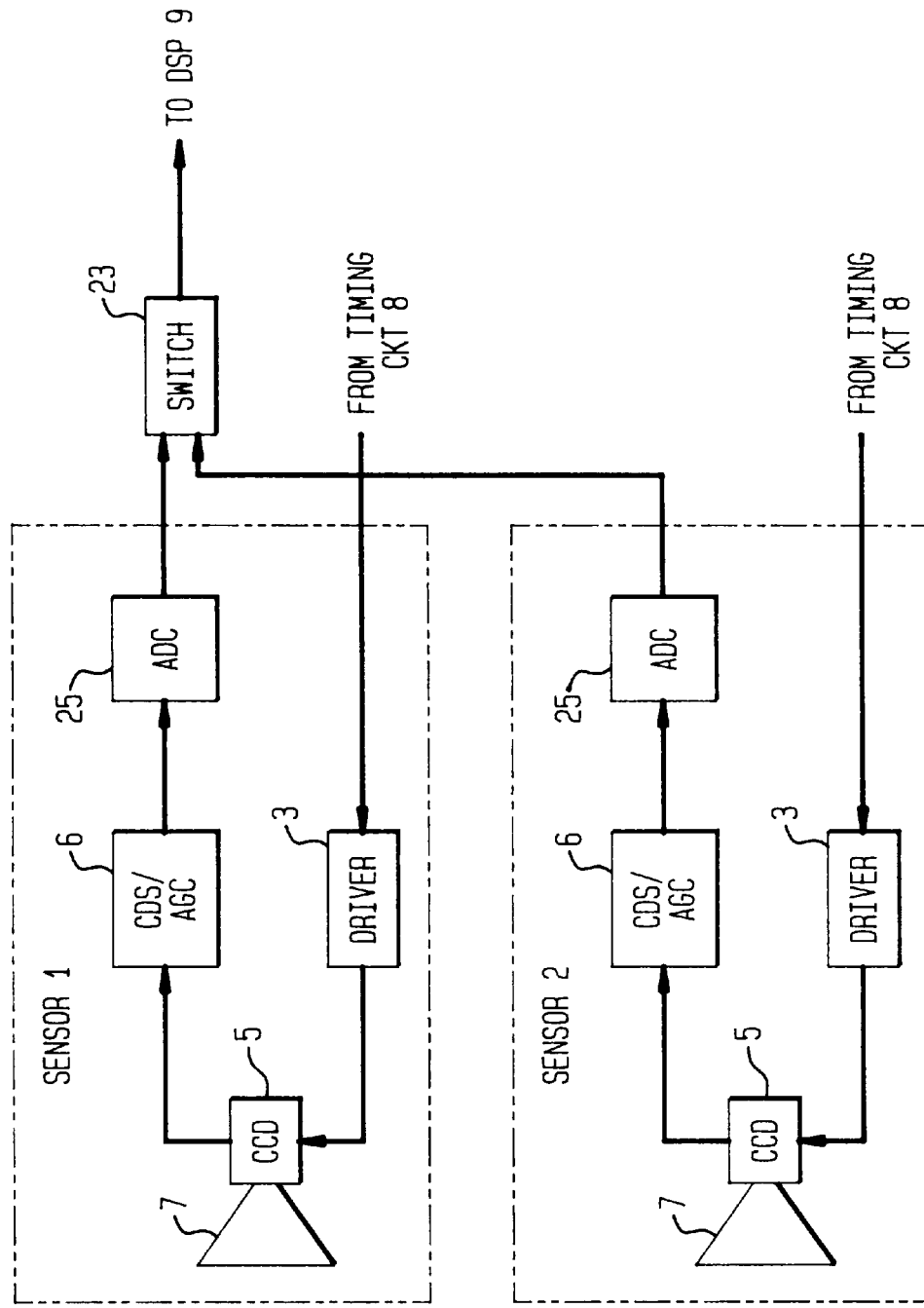

ed*US 6,288,742 B1*

VIDEO CAMERA INCLUDING MULTIPLE IMAGE SENSORS

This application is a continuation of application Ser. No. 08/531,982, filed on Sep. 21, 1995 ABN.

BACKGROUND OF THE INVENTION

1. Field of the Invention

The present invention relates to a video camera and, more particularly, to a digital video camera including a plurality of lenses and image sensors and common digital video signal processing circuitry for processing signals from each of the image sensors.

2. Description of the Related Art

Visual communication over point-to-point telecommunication networks has become an increasingly useful and economic alternative for information exchange in business and consumer applications. A common element of all visual communication systems is the video input device. To date, video input devices have generally been based on variations of traditional video camcorder technology.

However, traditional camcorder-type video cameras impose severe limitations on the format and capabilities of present day video conferencing. For example, there often occurs a need to switch camera views quickly from one room view to another or from face-to-face view to face-to-document view. Present methods for achieving these various views incorporate motor driven pan/tilt stages and/or multiple cameras.

Unfortunately, such methods for achieving multiple views can be cost prohibitive since a plurality of complete camera units each including a pan/tilt stage are expensive to purchase, maintain and operate. In addition, the speed at which the typical pan/tilt stage operates limits the desirability of such a system which often must operate in real time. For example, during a multimedia conference in which a plurality of speakers are seated in one conference room, it may be desirable to switch views depending on which speaker is talking. If one camera having a pan/tilt stage is provided, by the time an operator positions the camera using the remote pan/tilt stage to capture a view of an active speaker, the speaker may change, thus requiring a further camera position change. A plurality of complete camera units can minimize this problem although this solution may be cost prohibitive.

The present invention is provided to overcome the above-noted disadvantages associated with the prior art.

SUMMARY OF THE INVENTION

The present invention relates to a digital camera including a first lens for focusing a first image, a second lens for focusing a second image, a first sensor for converting a light intensity and color pattern of the first image into a first electrical signal, a second sensor for converting a light intensity and color pattern of the second image into a second electrical signal, a processing unit for processing the first and second electrical signals and a switch for selectively coupling either the first electrical signal or the second electrical signal to the processing unit.

Accordingly, the present invention provides a device in which images received through a plurality of lenses can be processed by the same processing circuit. An advantage of using a plurality of lenses is that a first lens can be a fixed focus lens that provides a relatively wide angle view of the room for face-to-face communication, for example, and a second lens can be a variable iris C-mount lens with manual focus control to provide higher resolution for face-to-document transmission, for example. In the alternative, a plurality of lenses can be arranged around the periphery of a conference room and the outputs fed to a common video processing unit. An operator can then control from which lens data is actively being received, by use of a keyboard or keypad provided on a controller or videophone, for example, or automatically by programming a camera controller.

BRIEF DESCRIPTION OF THE DRAWINGS

So that one skilled in the art to which the subject invention appertains will better understand how to practice the present invention, preferred embodiments of the invention will be described in detail below with reference to the accompanying drawings, in which:

FIGS. 2A–2D are block diagrams of a dual lens digital camera according to embodiments of the present invention;

DETAILED DESCRIPTION OF THE PREFERRED EMBODIMENTS

Figure 1:
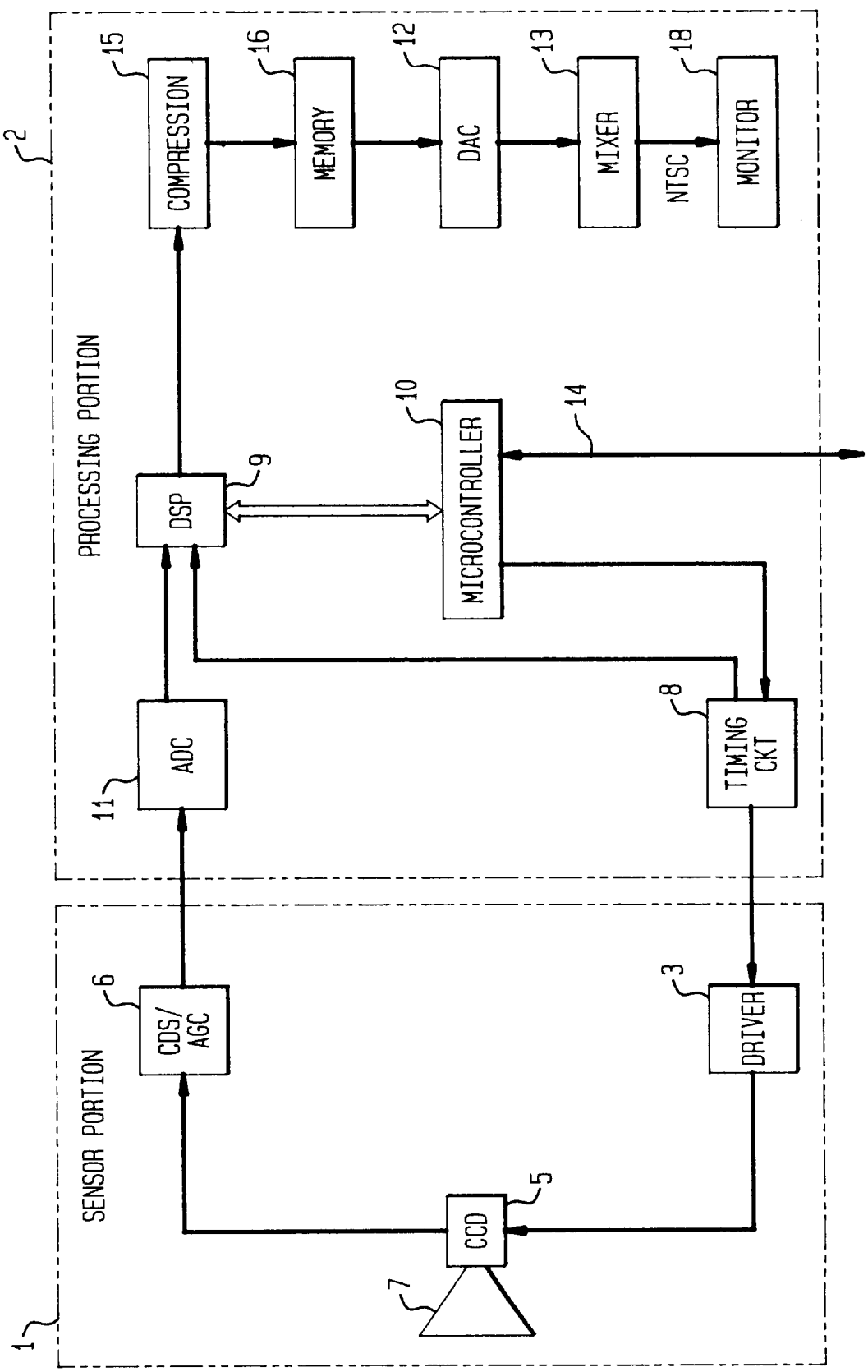
FIG. 1 illustrates a block diagram of a typical digital video camera.

Referring to the drawings in which like reference numerals identify similar or identical elements, FIG. 1 illustrates a digital video camera arrangement that may be used for implementing preferred embodiments of the present invention. The digital video camera can consist of a digital movie camera as disclosed by Hitachi in its MV-DS6A digital camera demo system, for example. Other examples of digital video cameras that may be used for implementing preferred embodiments of the present invention include those disclosed in U.S. Pat. Nos. 5,343,243, 5,264,944 and 5,371,540, for example.

As depicted in FIG. 1, a typical digital video camera consists of a sensor portion 1 and a processing portion 2. Sensor portion 1 includes driver 3, charge coupled device (CCD) 5, correlated double sampling/automatic gain control (CDS/AGC) 6 and lens 7. Processing portion 2 includes analog to digital converter (ADC) 11, digital signal processor (DSP) 9, microcontroller 10, timing circuitry 8, compression circuit 15, memory 16, digital to analog converter (DAC) 12, mixer 13, and, optionally, monitor 18.

Operation of a typical digital video camera that can be used for implementing embodiments of the present invention is generally well known in the art and will therefore be described in only brief detail below.

During recording, incident light from an image passes through lens 7 and is converged onto CCD 5. CCD 5 converts the light intensity and color pattern of the image into electrical signals. Using timing and control signals generated in timing circuit 8 and provided to CCD 5 through driver 3, the electrical signals are output from CCD 5 by raster scans and input to CDS/AGC 6. The CDS portion of CDS/AGC 6 eliminates a low-frequency noise component from the electrical signals. The AGC portion of CDS/AGC 6 provides automatic gain control for preventing later stages, and particularly ADC 11, from being overloaded. CDS/AGC 6 outputs raw CCD analog signal data that is input to ADC 11. ADC 11 acts as a sampling A/D converter, sampling the raw CCD analog signal data at predetermined intervals and outputting digital data to DSP 9. Under control from microcontroller 10, DSP 9 performs low level video processing on the video information, including color matrix conversion, clip level adjustment, gamma compensation and Y/C digital multiplexing, for example.

DSP 9 outputs eight-bit digital multiplexed luminance and chrominance data in a nominal 4:2:2 or 4:1:1 format. The digital data output by DSP 9 can then be compressed by compression circuit 15 and stored in memory 16, for example. Alternatively, the digital data output by DSP 9 can be immediately processed and displayed.

Microcontroller 10 can consist of an eight-bit microcontroller such as Hitachi's H8/300. Microcontroller 10 performs system functions such as loading DSP 9 registers with power-up values for white balance, iris and gain control, etc. Microcontroller 10 also includes a serial input/output port (I/O) 14 for providing a serial interface for user control of camera functions during operation.

The digital data stored in memory 16 can be read and input to a 2 channel digital-to-analog converter DAC 12 such as Hitachi's HD49307. The analog output of DAC 12 can then be fed through an analog luminance/chrominance mixer 13 such as Mitsumi's 1029 and output as an NTSC format composite video signal for display on video monitor 18.

Figure 2A:
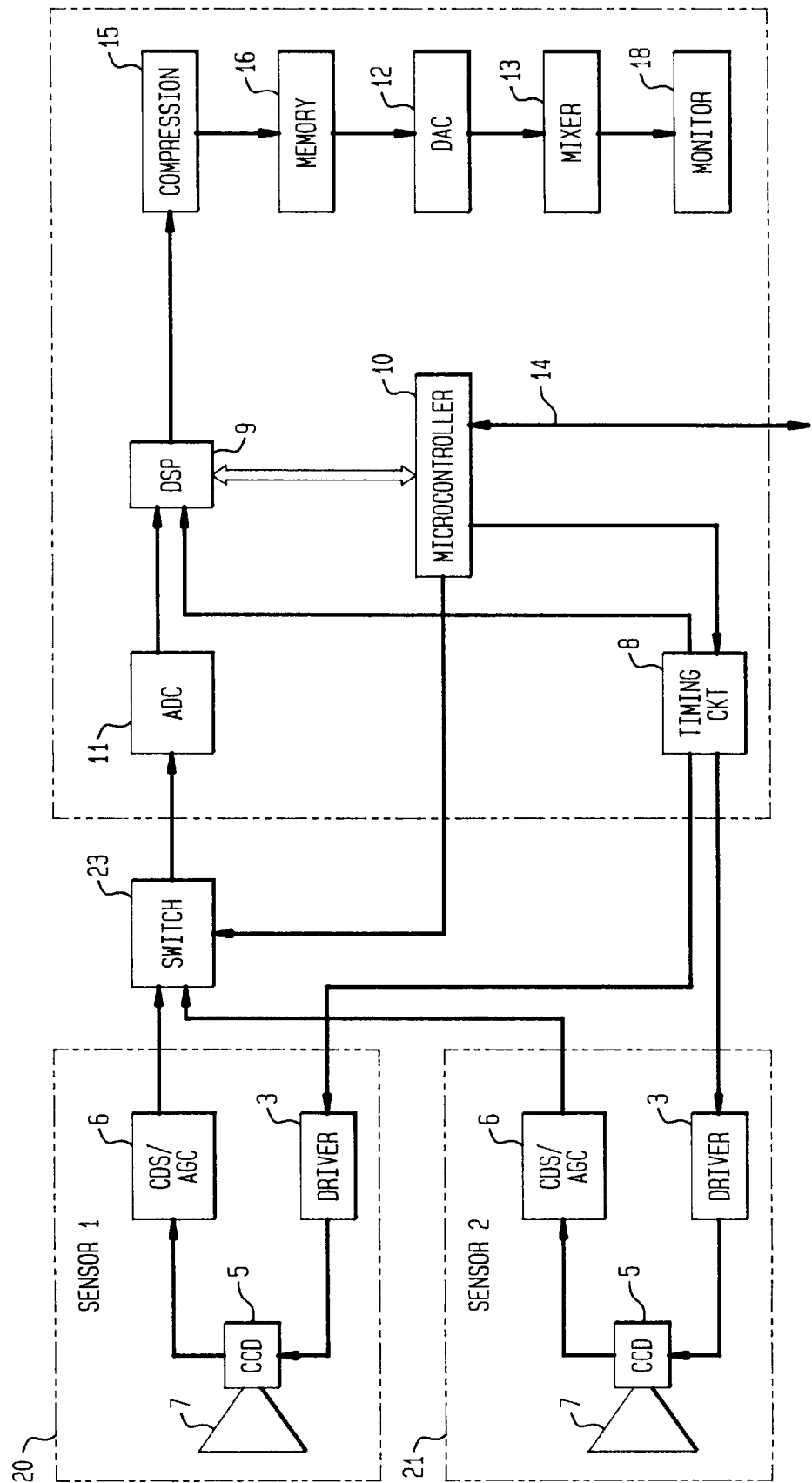

As shown in FIG. 2A, according to a preferred embodiment of the present invention, two individual image sensor portions 20 and 21 are provided. A switch 23 is provided for selectively switching the raw CCD signal output from image sensor portion 20 or 21 to the input of ADC 11. Switch 23 can be any switch suitable for switching video signals and can consist of a mechanical switch or a solid state switch, for example, although to reduce switching time and overall cost, a solid state switch is preferred. Switch 23 can be controlled by microcontroller 10. For example, a user can input a switching command through serial I/O 14, using a remote keyboard, joystick or other input device. Switch 23 can be provided either as a separate and distinct unit or can be incorporated into the processor circuitry.

In addition, according to another embodiment of the present invention as shown in FIG. 2B, each sensor portion includes its own ADC. Each ADC 25 and 26 converts the raw CCD signal output from image sensor portion 20 and 21, respectively, and outputs digital data that is input to switch 23. Switch 23 is selectively controlled by microcontroller 10 to output the digital data from ADC 25 or ADC 26 to DSP 9, where it is processed. According to this embodiment of the present invention, it would be necessary to provide eight additional wires between each sensor portion and switch 23 for communicating the eight bit digital data from the ADCs. In order to reduce the number of wires that must be provided between each sensor portion and switch 23, it may be preferable to provide a high speed parallel to serial converter such as that used in the P1394 serial interface standard, for converting the parallel data output by the ADCs to serial, and transferring the serial data to switch 23. The data could then be transferred back to parallel form for processing by DSP 9. Transferring digital serial data between the sensor units and the processing unit provides excellent transmission characteristics resulting in low noise and error correction capabilities.

Figure 2C:
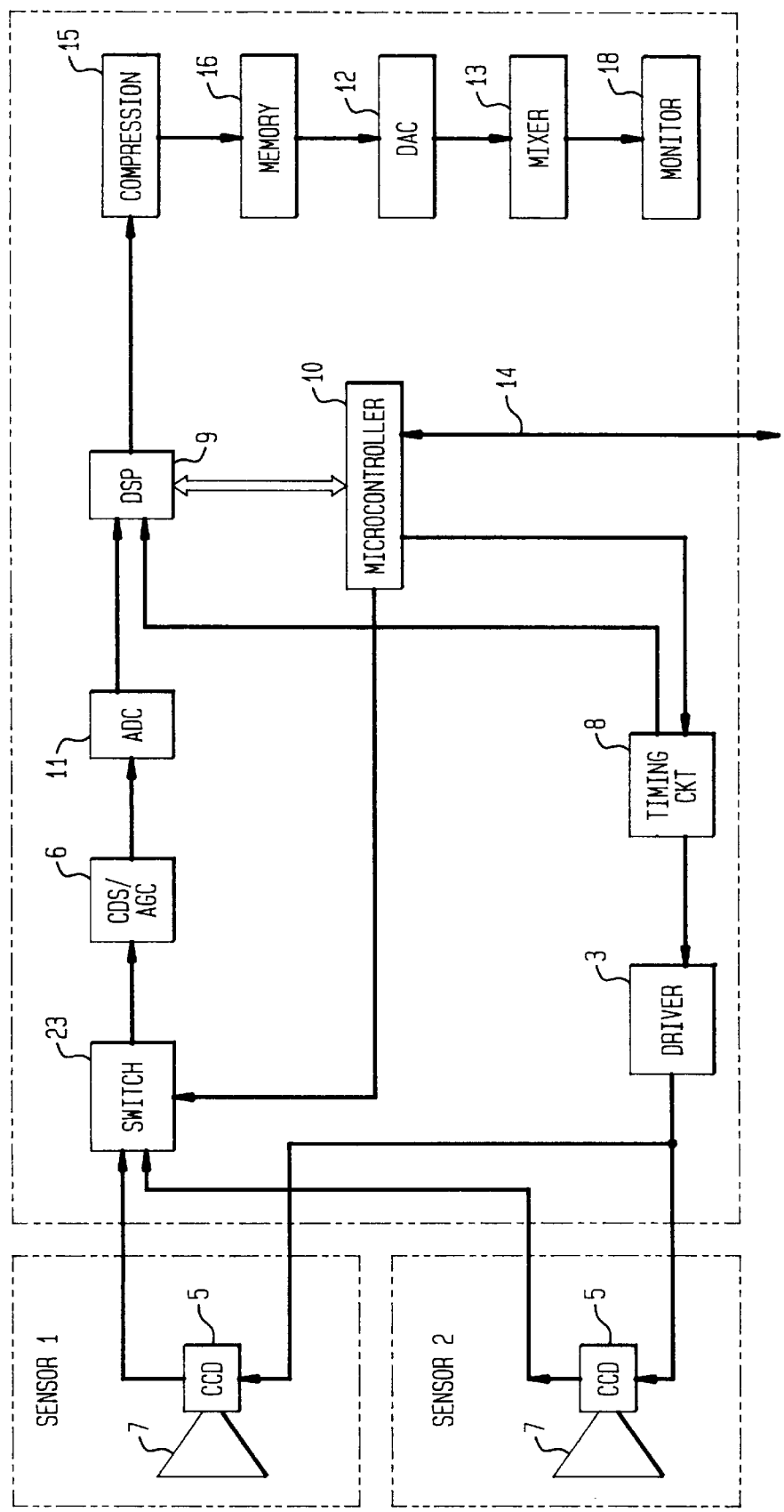

According to the embodiment of the present invention depicted in FIG. 2C, the number of electronic components required for each of the sensors can be further reduced, thus reducing the cost of each sensor. Since each CCD 5 is driven with the same drive signals, a common driver 3 could be provided on the processor portion of the circuitry for driving each CCD 5, as shown. In addition, a common CDS/AGC 6 could be provided between switch 23 and ADC 11. Accordingly, each sensor would consist essentially of a lens 7 and CCD 5. The outputs of CCDs 5 could then be appropriately selected by switch 23 to provide the desired CCD output to the input of CDS/AGC 6. The output of CDS/AGC could then be converted by ADC 11 and processed by DSP 9 as described above. In general, relatively low level signals are provided at the outputs of the CCDs. Accordingly, due to noise considerations, this embodiment of the present invention would be most useful for arrangements where the sensors are provided relatively close to the processing electronic circuitry (e.g., in a compact multi-lens video camera).

Figure 2D:
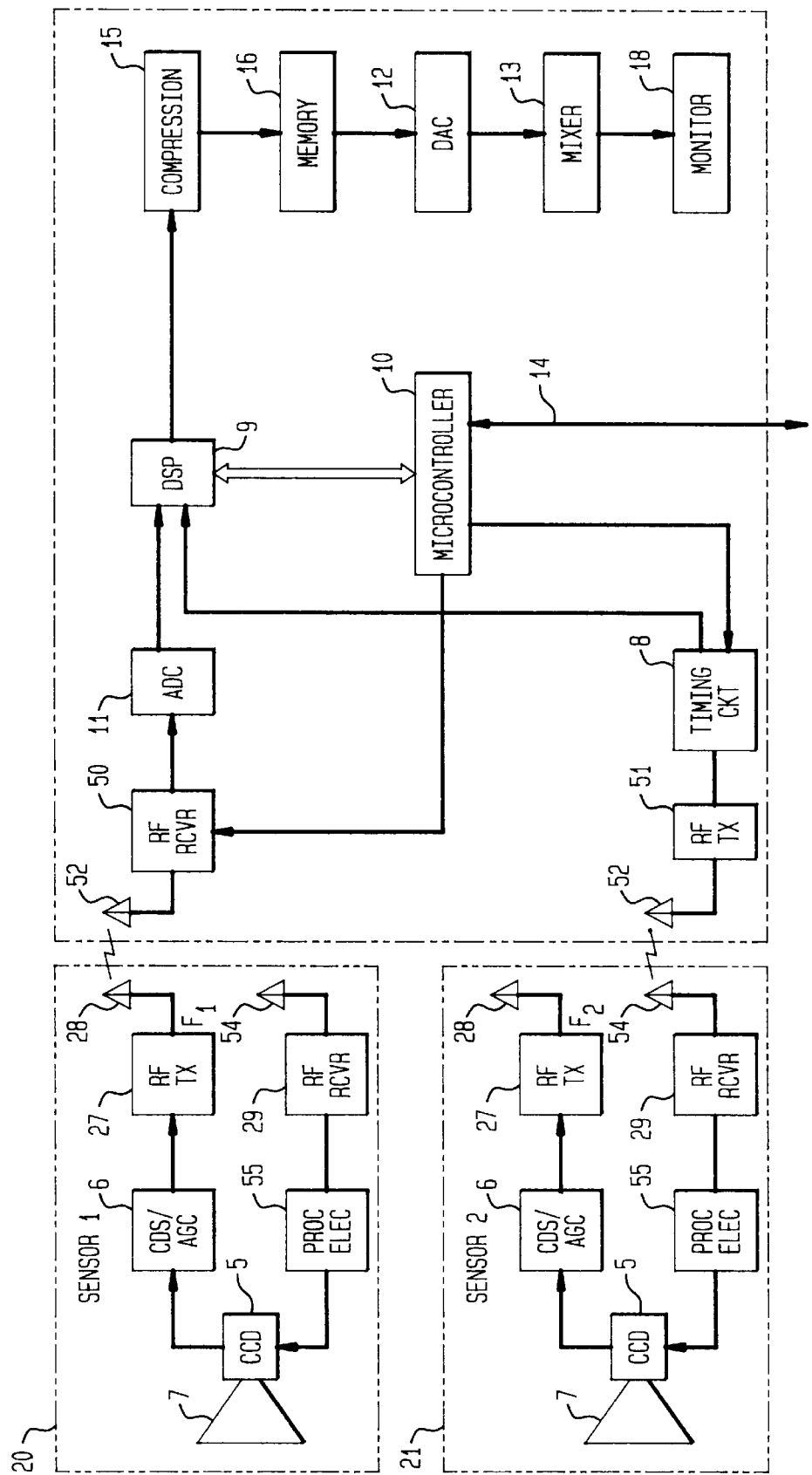

The electrical connection between each sensor and the processing electronics need not be hard wired. For example, according to an embodiment of the present invention depicted in FIG. 2D, a known RF transmission technique may be utililed for transmitting signals between each sensor and the processing electronics. As shown, the processing electronics include RF transmitter 51 for RF modulating the timing signals from timing circuit 8, and antenna 52 for transmitting the modulated signals. According to this embodiment of the present invention, each sensor includes a receiving antenna 54 for receiving the modulated timing signals, RF receiver 29 for demodulating the received timing signals and processing electronic circuitry 55 for performing the necessary processing on the received timing signals for converting the demodulated signals from analog to digital and for formatting the digital data into the proper format for driving CCD 5. Since each sensor unit receives common drive signals, a single frequency can be used for modulating the drive signals.

Each sensor also includes an RF transmitter 27 for RF modulating the analog video data signal output by CDS/AGC 6. The modulated video data signal is then transmit via antenna 28. The processing electronics include antenna 53 for receiving the modulated video data signal. The received signal is demodulated by RF receiver 50 and forwarded to ADC 11 for processing. Since each sensor is transmitting different video data, each sensor unit could be arranged to transmit at a different frequency. Microcontroller 10 could then selectively "switch" the output of the desired sensor to the input of ADC 11 by selectively controlling RF receiver 50 to choose which frequency signal to demodulate. This embodiment of the present invention would be useful in an environment where it is not practical to provide numerous cables between the sensors and the processing electronics, for example.

The arrangements depicted in FIGS. 2A, 2B, 2C and 2D allow a user to select from which lens an image is to be recorded or viewed. By using common drive and processing electronics for the two sensor portions 20 and 21, camera functionality can be increased while keeping component costs low.

Figure 3:
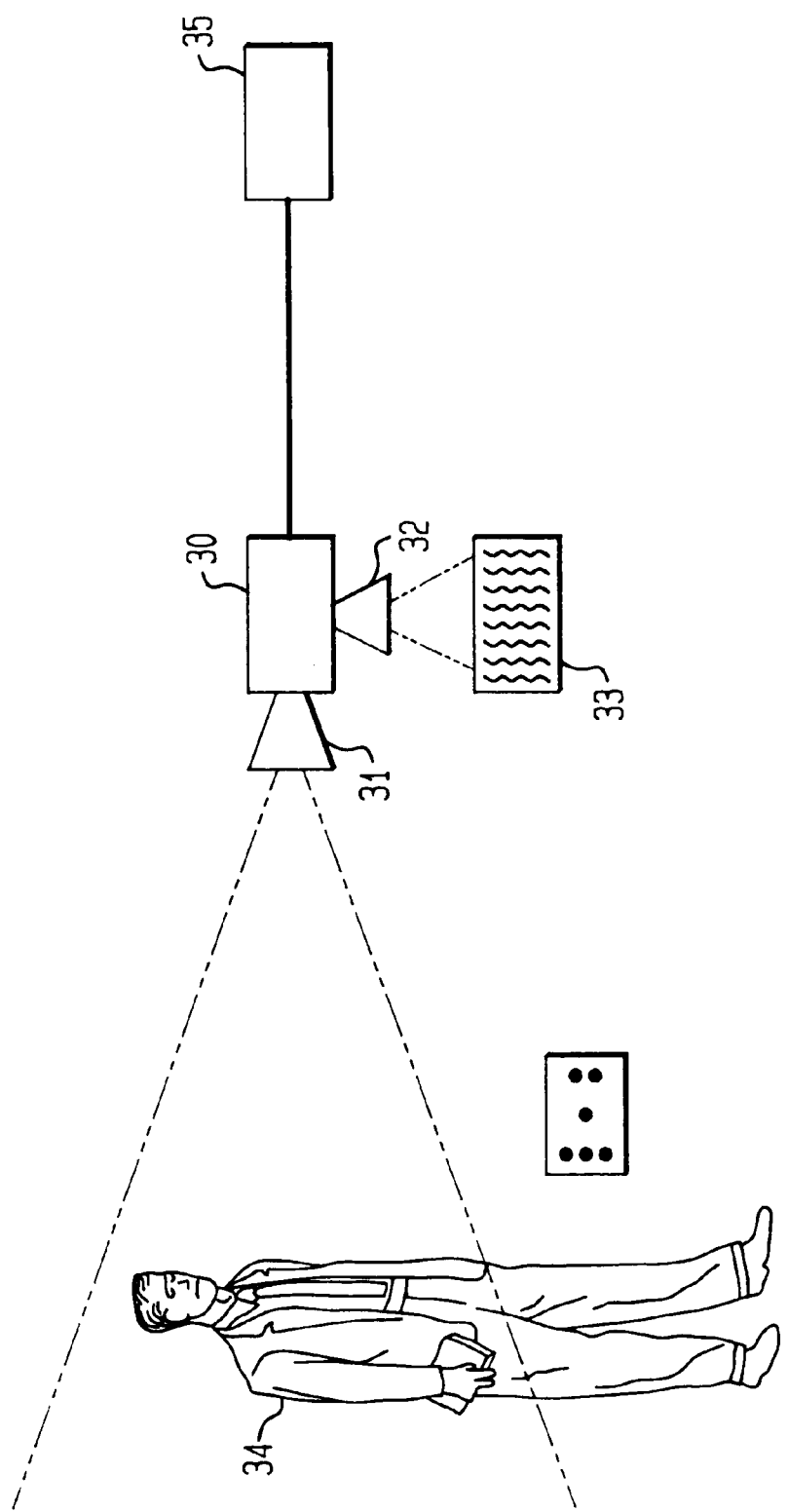
FIG. 3 depicts a use for a dual lens camera arrangement according to an embodiment of the present invention.

As depicted in FIG. 3, according to an embodiment of the present invention, camera 30 can be arranged with a first lens 31 and a second lens 32. For example, lens 31 can consist of an 8 m/f2.0 fixed focus lens for providing a relatively wide-angle view of a room and lens 32 can consist of a 16 mm variable iris C mount lens with manual focus control, for example, for providing high resolution document transmission capability. Lens 31 can be arranged for a room view of a conference participant 34 to provide face-to-face communication during a videotelephone conference, for example. Second lens 32 can be arranged for viewing document 33.

During a videotelephone conference, the present invention permits fast switching between an image of the room as seen through lens 31 or an image of document 33 as seen through lens 32, without the need for expensive and tediously slow moving pan/tilt stages and/or a plurality of complete camera units. The video information from camera 30 can be transmitted to remote terminal 35 which can be a remote computer terminal having multimedia capabilities, for example. In addition to having the capability to display the video information from camera 30, an operator at terminal 35 is capable of controlling camera 30 to selectively switch between views from lens 31 or lens 32. In the alternative, conference participant 34 can be provided with a control pad for selectively switching between views from lens 31 or lens 32.

Figure 4:
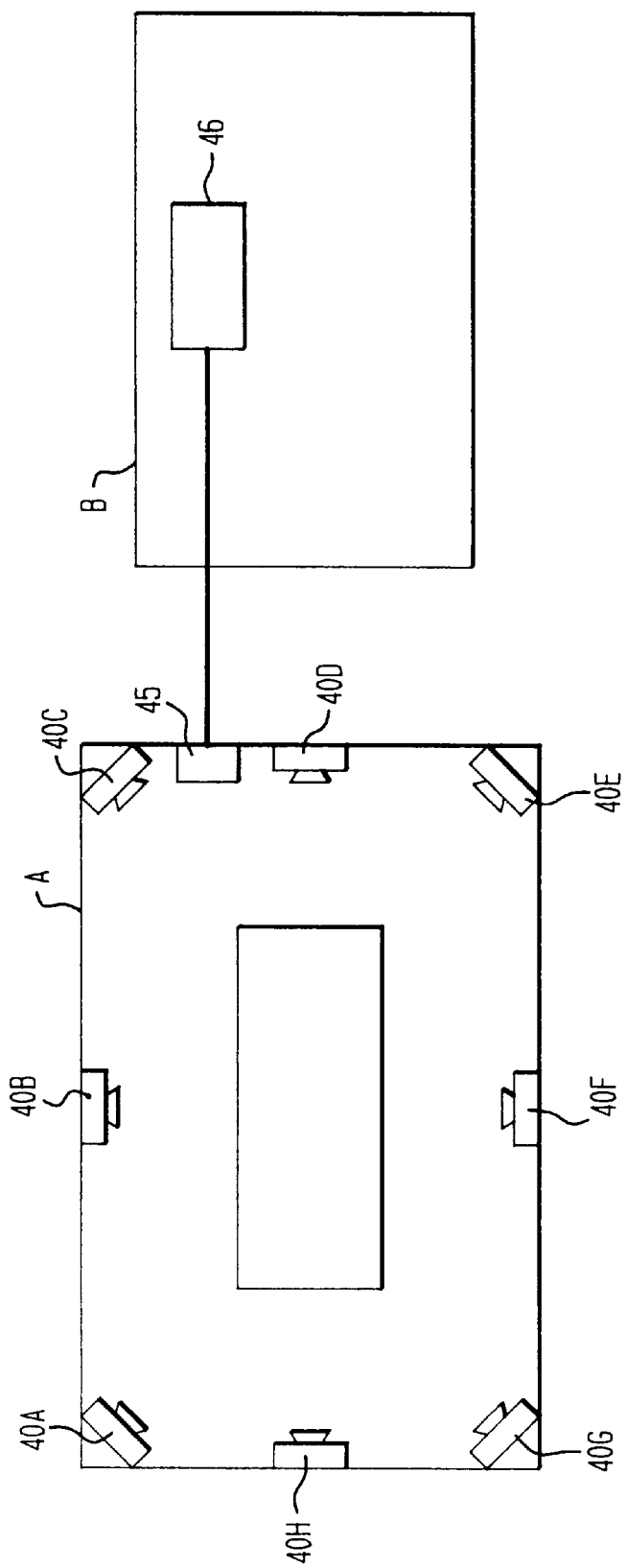
FIG. 4 illustrates a multi-lens camera arrangement according to an embodiment of the present invention.

According to another embodiment of the present invention as depicted in FIG. 4, a plurality of sensor units 40A–40H are arranged around the periphery of conference room A, for example. Each sensor unit 40A–40H is similar to sensor portion 20 and 21 as depicted in FIGS. 2A or 2B, for example. A processor unit 45, similar to the processor depicted in FIG. 2A, includes a remotely controllable switch that is capable of selectively coupling the outputs of sensor units 40A–40H to the processing circuitry in processor unit 45. The remotely controllable switch can be operated either locally by an operator in room A or remotely by an operator at terminal 46 in room B. An operator either in room A or in remote room B can then manually switch between sensor units 40A–40H for different views of conference room A. The present invention thus provides a very cost effective way of enabling a plurality of views of a room without the need of providing a plurality of complete camera units each having separate video processing electronics. Since each sensor unit requires minimal electronics, the sensors can be provided in a very compact discrete unit.

According to yet another embodiment of the present invention, the image sensors can be arranged in a predetermined configuration on a platform provided in the center of a conference room, for example. Using known digital video signal processing techniques, the video outputs from two or more adjacent sensors can be digitally combined by the processing electronics to achieve a wide angle view and/or a high resolution image of the conference room. In addition, the video outputs from all of the sensors can be digitally combined to achieve a seamless 360° view of the conference room. By simultaneously performing known processing techniques on the video data output from each of the sensors, electronic pan/tilt and zoom capabilities can be provided. In other words, since the cost of each sensor unit is minimal compared to the cost of a complete camera unit, a large number of sensor units can be arranged in any desired configuration. The video outputs from the camera units can then be combined and/or processed to achieve various video effects and views.

Although the present invention has been described using CCD image sensors, it is not intended to be limited to any particular type of image sensor. For example, embodiments of the present invention could utilize CMOS image sensors in place of, or in combination with, CCD image sensors.

It will be appreciated that the foregoing description and drawings are only intended to be illustrative of the present invention. Variations, changes, substitutions and modifications of the present invention may occur to those skilled in the art without departing from the spirit and scope of the present invention. Accordingly, it is intended that the present invention be limited only by the scope of the appended claims.

What is claimed is:

1. A digital camera system comprising:

a plurality of sensor units, each having a lens for capturing an image and a sensor for outputting electrical information corresponding to the image, each said sensor unit being disposed at a distinct equipment location remote from the other sensor units;

a processor, disposed at a first equipment location remote from at least one of the plurality of sensor units, and electrically coupled to each of said sensor units, for processing the electrical information output by the plurality of sensors;

a selector, for selectively providing the information from a selected one of the plurality of sensors, to the processor, said selector comprising a microcontroller coupled to said processor;

said processor and said microcontroller being disposed at said first equipment location remote from the equipment locations of each of said sensor units;

said digital camera system further including at said first equipment location, a timing circuit for generating timing signals, and a radio frequency (RF) transmitter operable to RF modulate and wirelessly transmit said timing signals;

each of said sensor units including an RF receiver for receiving and demodulating said modulated timing signals transmitted by said RF transmitter, a processing circuitry for driving the sensor therein responsive to said received timing signals, and a further RF transmitter for RF modulating and wirelessly transmitting the respective analog electrical signal provided by the sensor therein; and said digital camera system further including at said first equipment location, another RF receiver, selectively controlled by said microcontroller, for receiving and demodulating the analog electrical signals transmitter by the sensor units, the received analog electrical signals being digitized by an A/D converter and provided to said processor for processing.

2. A digital camera according to claim 1, wherein:

said further RF transmitters within said sensor units are operable to transmit said modulated electrical signals at different RF frequencies; and said another RF receiver being operative to select, under the control of said microcontroller, which of said modulated electrical signals to demodulate.

3. The digital camera according to claim 1, wherein said distinct equipment locations are in different peripheral locations of a room.

4. A camera, comprising:

a first sensor unit consisting essentially of a first lens for focusing a first image and a first sensor for converting light intensity of the first image into a first electrical signal;

a second sensor unit consisting essentially of a second lens for focusing a second image and a second sensor for converting light intensity of the second image into a second electrical signal; and a circuit arrangement, coupled to each of said sensor units, including a processor for processing the first and second electrical signals, a common driver for driving each of said sensor units, a switch for selectively directing either the first or second electrical signals towards the processor, and a common correlation double sampler coupled between the switch and the processor for eliminating low-frequency noise components from the electrical signals.

5. The camera according to claim 4, wherein each of said sensors comprises a charge coupled device.

6. The camera according to claim 4, wherein said circuit arrangement further includes automatic gain control means coupled between said switch and said processor for controlling gain of said electrical signals.

7. The camera according to claim 6, further comprising an analog to digital converter coupled between said switch and said processor for digitizing said electrical signals.

* * * * *